United States Patent [19]

Nally et al.

[11] 4,457,015
[45] Jun. 26, 1984

[54] MATRIX CHARACTER PREPROCESSING SYSTEM

[75] Inventors: Robert B. Nally; James F. Akister; Patrick C. Leung, all of Waterloo; Eric J. Vance, Kitchener, all of Canada

[73] Assignee: NCR Corporation, Dayton, Ohio

[21] Appl. No.: 331,936

[22] Filed: Dec. 17, 1981

[51] Int. Cl.³ .............................................. G06K 9/32
[52] U.S. Cl. ........................................ 382/45; 382/48
[58] Field of Search ....................... 382/48, 44, 45, 52, 382/54, 18

[56] References Cited

U.S. PATENT DOCUMENTS 4,136,332 1/1979 Kadota et al. ......................... 382/45

Primary Examiner—Leo H. Boudreau
Assistant Examiner—E. A. McDowell
Attorney, Agent, or Firm—J. T. Cavender; Wilbert Hawk, Jr.; Richard W. Lavin

[57] ABSTRACT

A system for processing data used by a recognition system in recognizing an unknown character. A multi-channel read member generates a plurality of parallel rows of data bits which taken together form an image of the character to be recognized. In order to align the rows of data in their proper relationship, each row of data bits is examined to determine if the row contains data representing a feature characteristic of the unknown character or a clear channel. The top row of the character is selected as the first row of data bits representing a feature characteristic of the character which follows the largest number of consecutive clear channel rows. The top two rows of the character are then compared. The row having the greatest number of feature characteristic data bits is selected as the top row of the character. Signals identifying the top row of the character are generated for us by a recognition apparatus in recognizing the unknown character from the rows of data bits generated.

12 Claims, 24 Drawing Figures

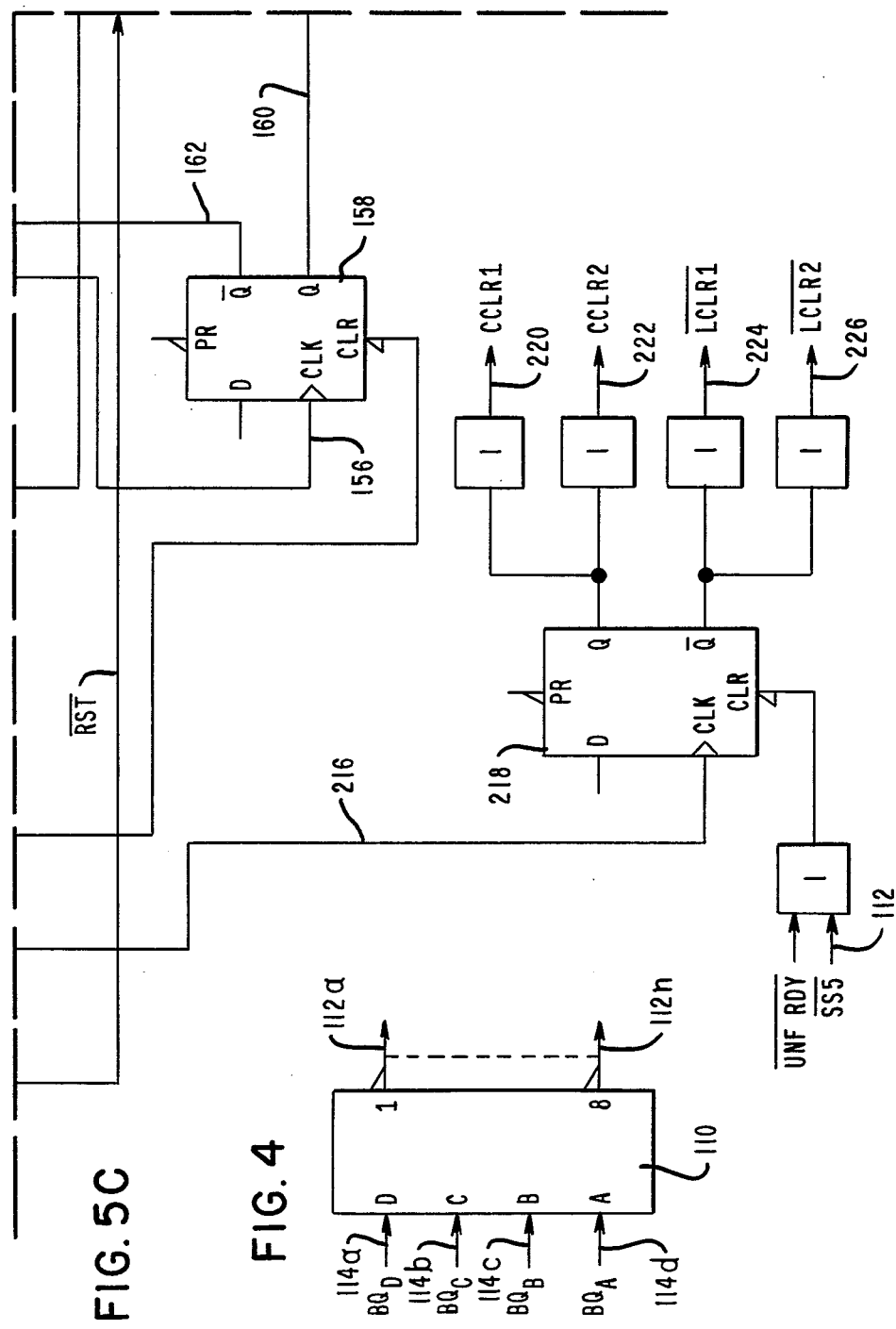

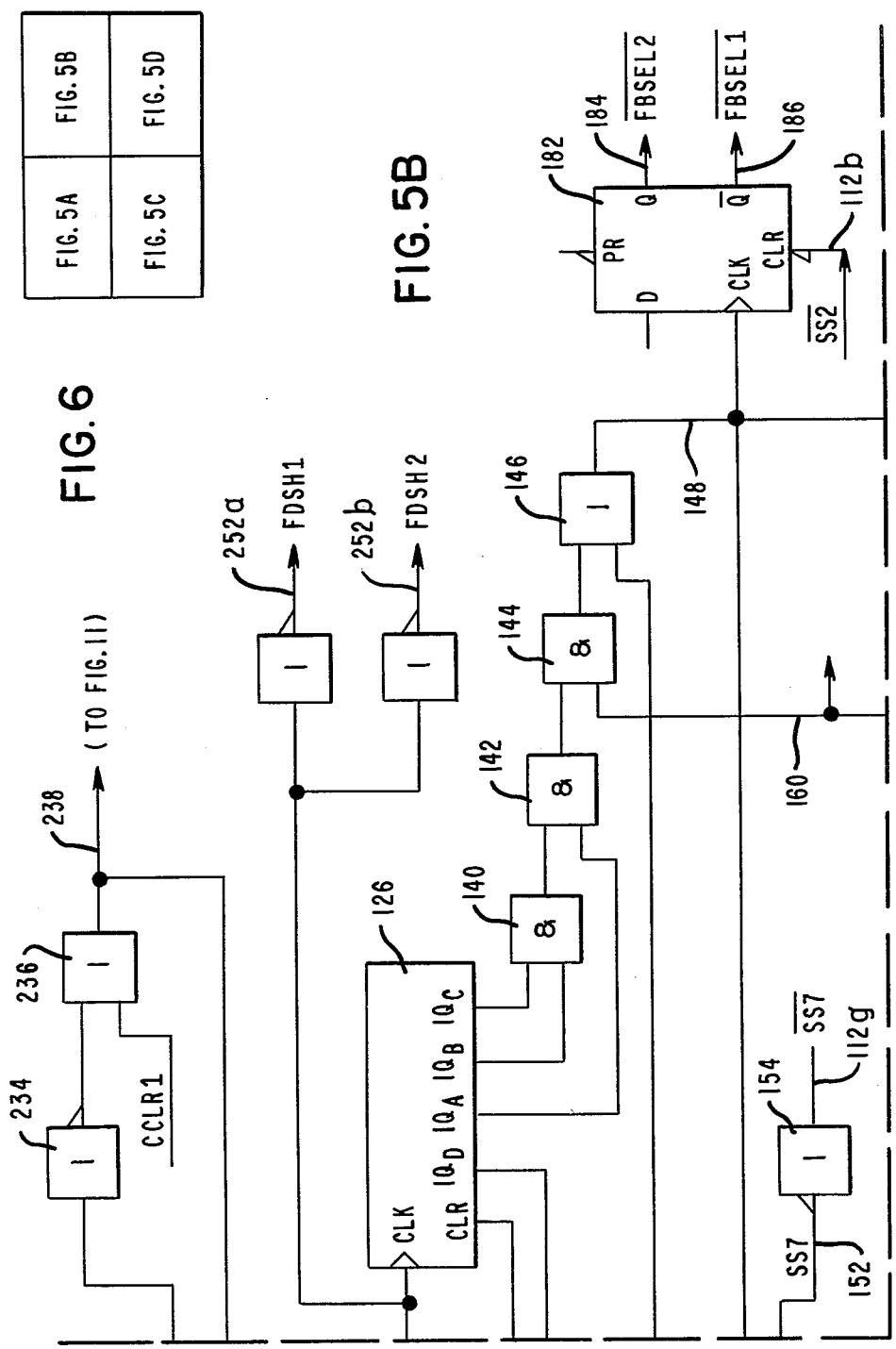

FIG.12
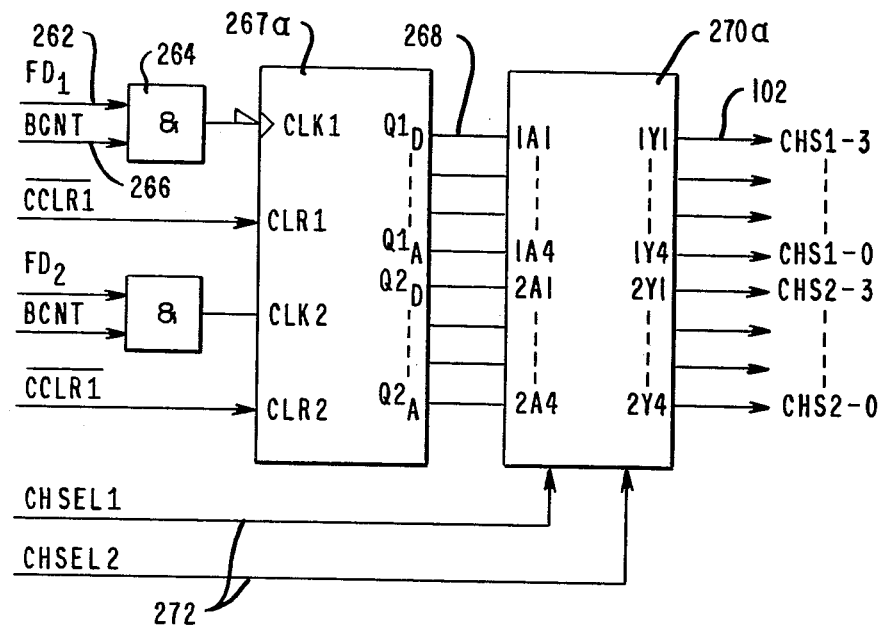
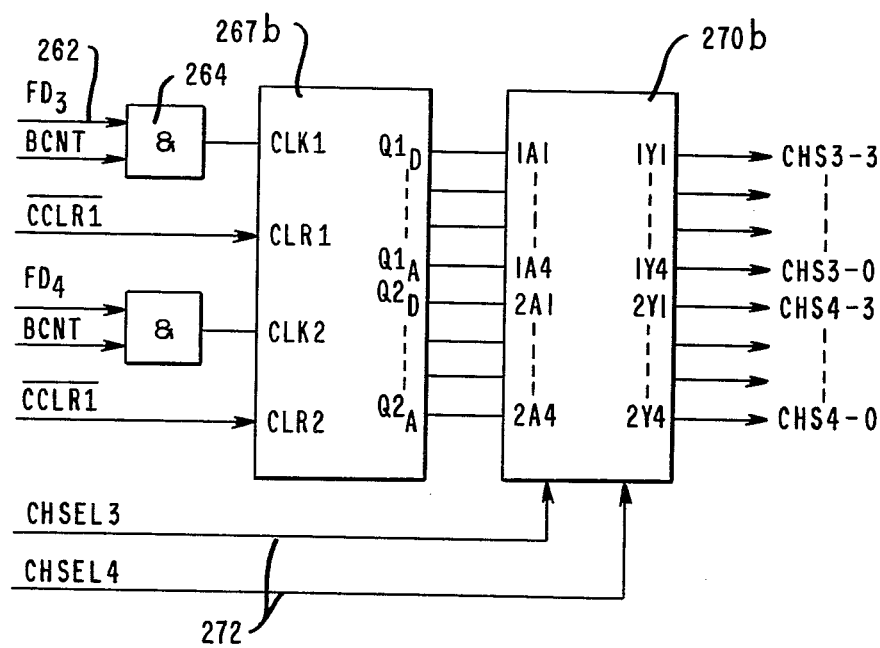

FIG. 13
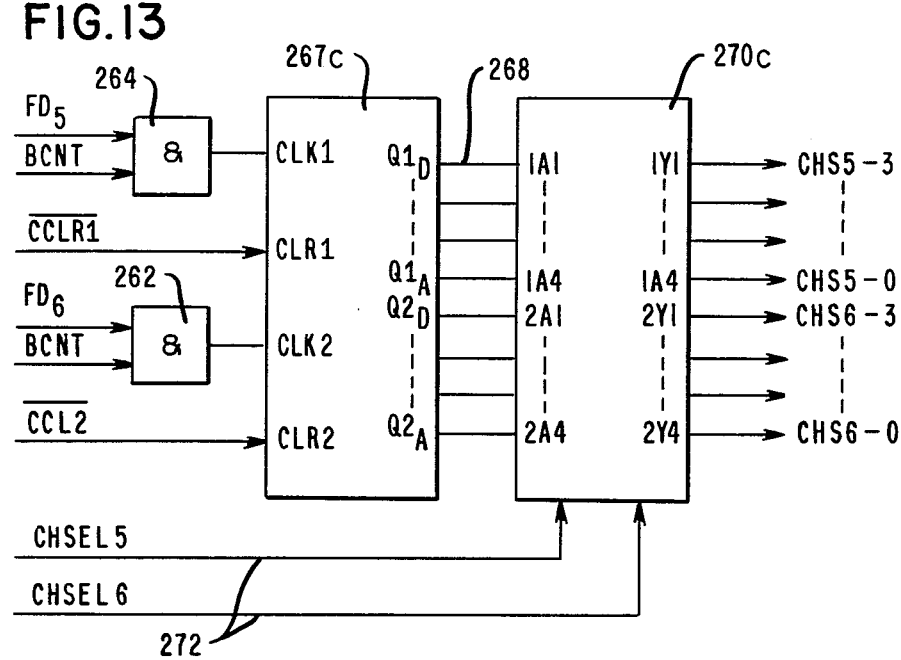
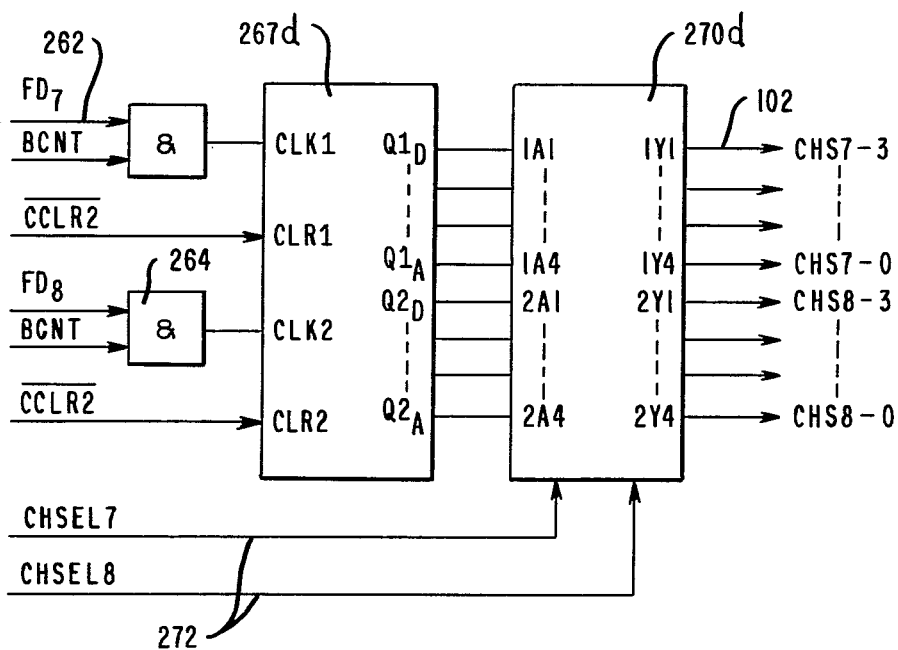

(4,457,015)

MATRIX CHARACTER PREPROCESSING SYSTEM

CROSS-REFERENCE TO RELATED APPLICATIONS

Reference is hereby made to the following copending patent applications, filed on even date herewith and assigned to the NCR Corporation: Matrix Character Recognition System, Ser. No. 331,935, by Nally et al. and Matrix Character Reading System, Ser. No. 331,946, by Nally et al.

BACKGROUND OF THE INVENTION

The present invention relates to the field of machine recognition of magnetically printed characters on a document, and more particularly to a document reader system in which a multiple-gap magnetic read head is used in reading magnetized characters embodied in the form of E-13B character font printed on a document.

In single-gap magnetic character reading systems, a single analog input waveform is obtained by passing the characters to be sensed, normally printed on a document, beneath a magnetic read head at least as wide as the height of the characters and having a single flux gap. The signal generated by the read head is a derivative waveform representing the rate of change of magnetic flux transversing the head as the characters are scanned. Since the distribution of ink, and thus flux, associated with each different character is unique, the waveform derived for each different character uniquely identifies that character.

In order to increase the amount of information that can be obtained when scanning the magnetically imprinted character, multiple-gap magnetic read heads have been proposed in which multiple waveforms are produced. Whereas the single-gap read head produces an analog waveform as the result of the D.C. magnetization of the channel to be read, the multiple-gap read head produces a magnetic image of the character as a result of the A.C. magnetization of the character. Problems found in using a multiple-gap read head lie in the size of the read head compared to the size of the character to be read. The read head itself consists of 30 separate tracks or channels which cover approximately 0.52 inches of the allowable MICR band. A MICR character, however, ideally spans only about 8 tracks (that is, about 0.12 inches). Therefore, every tenth channel is multiplexed together and brought out as a single channel. That is, tracks 1, 11 and 21 are tied together and brought out as channel 1, tracks 2, 12 and 22 are tied together and brought out as channel 2, and so on.

If a MICR character is positioned in the MICR band on the document such that the top of the character crosses tracks 1, 11 and 21 of the read head, then output channels 1-8 will transmit the signal with channels 9 and 10 blank. In this case, the character in each is properly oriented. If, however, the top of an MICR character crosses track 15, for example, so that it covers tracks 15 to 22, then output channel 5 will contain the top-of-character signal and output channel 2 will contain the bottom-of-character signal with channels 3 and 4 blank. In this case, the character image is said to be folded. In order to proceed with the character identification, the image must be unfolded so that it covers channels 1-8 with channels 9 and 10 blank. It is therefore an object of this invention to provide an improved method for processing data used in a character recognition system.

It is another object of this invention to improve the form of the data generated by a multi-gap read head.

It is a further object of this invention to provide that the data read by a multi-gap read head is properly oriented for use by a character recognition system in recognizing the character.

SUMMARY OF THE INVENTION

These and other objects of this invention are fulfilled by providing a character recognition system including a multi-channel read head which generates in each channel a plurality of analog waveforms which form an image of the character read. The analog signals are digitized, rectified and thresholded to provide a multi-column binary bit map of the character in which a logical 1 represents a spot of ink and a logical 0 represents a blank space. Each column is then examined for the presence of any blank spaces surrounded by ink spots which, if this does occur, are replaced by an ink spot. Each seven bits of data in each channel are then replaced by a single data bit representing the seven bits as an ink spot or a blank space. The columns in the reduced data bit map are then examined to locate a clear channel. The two non-clear channels following the clear channel are then examined to determine the top row of the character. If the number of binary one bits found in the second non-clear channel is equal to or greater than twice the number of binary one bits in the first non-clear channel, the second non-clear channel is selected as the top row. The channel of data selected to be the top row of the character scanned is then outputted to a template matching system which applies known templates to the properly orientated outputted data to identify the unknown character.

BRIEF DESCRIPTION OF THE DRAWINGS

The foregoing and various other objects, acknowledged advantages and meritorious features of the present invention will be apparent from the following detailed description and appended claims, when read in conjunction with the drawings, wherein like numerals identify corresponding elements.

FIG. 4, on the sheet containing FIG. 5C, is a diagram of the logic circuit for generating the various sequencing control signals;

FIGS. 5A-5D inclusive, taken together, disclose the logic circuits found in the window generator unit of FIG. 3;

FIG. 6, on the sheet containing FIG. 5B, is a diagram showing the manner in which FIGS. 5A-5D inclusive are arranged to form the logic circuits;

FIGS. 12–14 inclusive are diagrams of the logic units forming the bit counter and tristate buffer unit of FIG. 3;

DESCRIPTION OF THE PREFERRED EMBODIMENT

Figure 1:
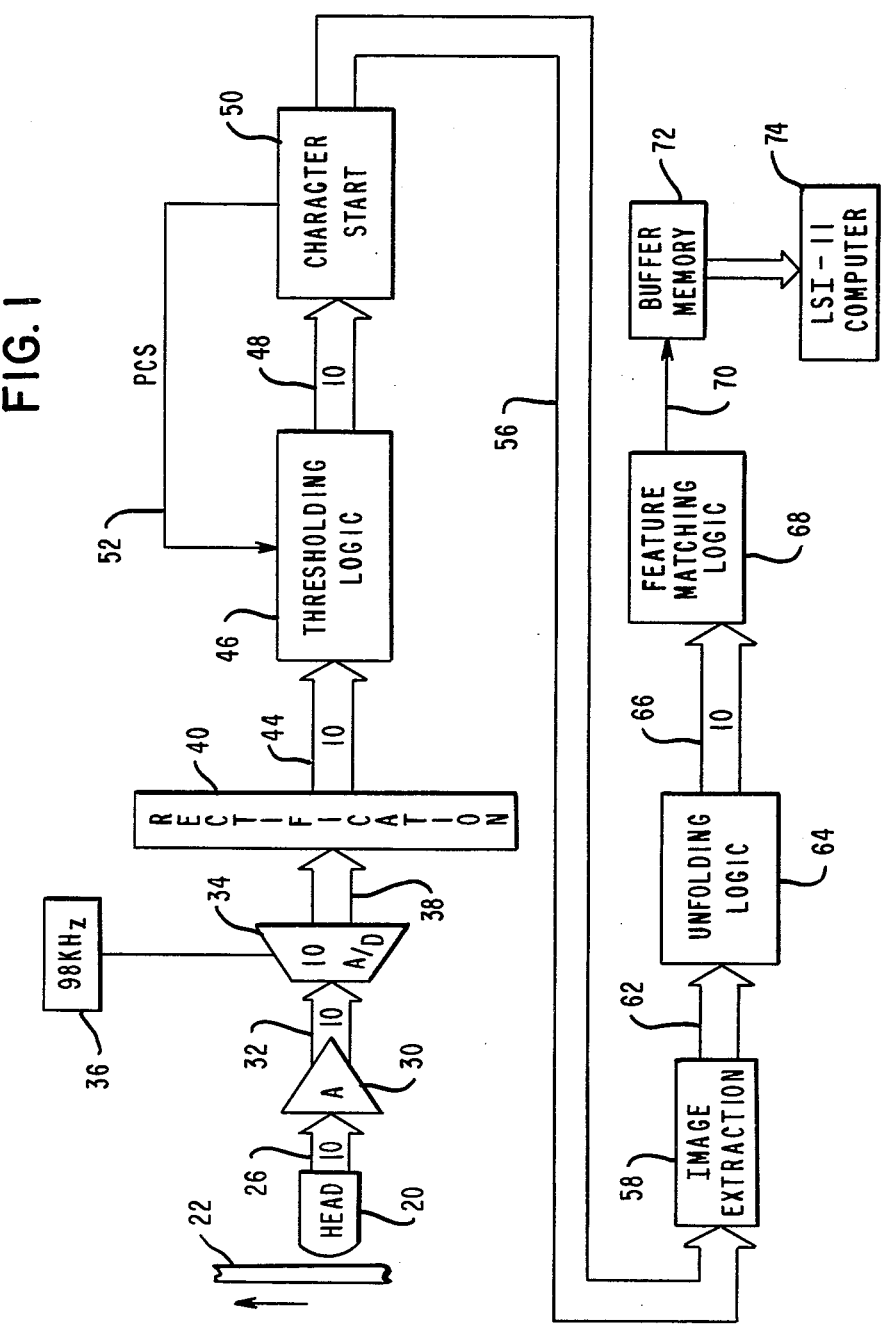
FIG. 1 shows a block diagram of the character reading system in which the present invention is found.
Figures 2A, 2B, 2C:
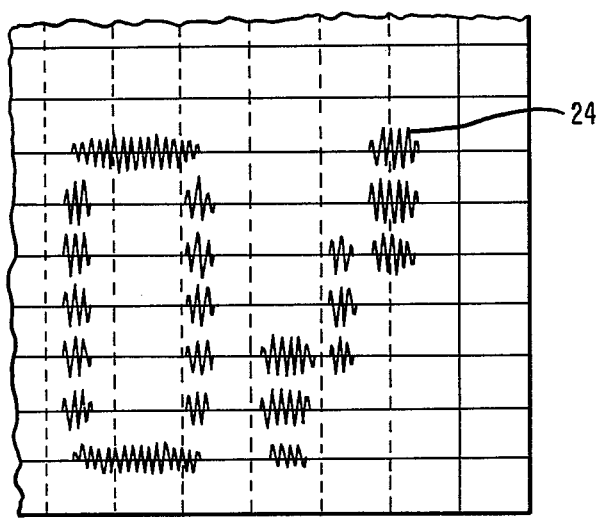
FIG. 2A is a schematic diagram of the analog signals generated by the multi-channel read head forming an image of the character read.
FIG. 2B is a diagram of a pattern of bits arranged to form the numeral 0.
FIG. 2C is a diagram of a pattern of bits showing the numeral 0 in a folded arrangement.

Referring to FIG. 1, there is shown a block diagram of the character recognition system which includes a multi-gap magnetic read head 20 positioned adjacent the path of movement of a document 22 having characters printed thereon in magnetic ink. While the preferred characters in the present embodiment are printed in the form of the E-13B character font which is well-known in the art and which has been adapted by the American Bankers Association for use with banking checks in this country, it is obvious that the recognition system of the present invention can be used with any character font which produces an image of the character read when scanned by the read head 20. The read head 20 consists of thirty magnetic pick-up channels in which every tenth channel is multiplexed to output ten channels of discrete analog signals over a bus 26 upon movement of the document 22 past the read head 20. As shown in FIG. 2A, an image of the character read is formed by the analog signal 24 in which the character is seven channels high. Each analog signal corresponds to the time derivative of the change of flux of the magnetized ink. Each of the analog signals 24 outputted by the read head 20 is amplified by Amplifier 30 and transmitted over bus 32 to a plurality of A.D. Converters 34 which sample the analog signals at a 98 KHz. rate by clock signals received from a Clock Generator 36. The digitized signals are then transmitted over bus 38 to a Rectifier unit 40 which outputs both positive and negative rectified signals over bus 44 to a Thresholding Logic unit 46 which applies static and dynamic threshold values to the digitized signals. The static threshold value is selected to have a signal level slightly above the background noise to separate the magnetic ink information from the background noise. The resulting thresholded data is then transmitted over bus 48 to a Character Start logic unit 50 which examines the data to locate the start of the character read. The Character Start logic unit 50, upon finding a character start, will generate a pre-character start signal PCS over line 52 enabling the Thresholding Logic unit 46 to examine the same data received over bus 44 using a dynamic threshold value based on the peak value of the analog signals received from the Rectifier 40. The threshold data is again transmitted to the Character Start logic unit 50 which determines the final start of the character read from the data received, together with the end of the character. These binary signals are transmitted over bus 56 to an Image Extraction logic unit 58 for use in locating the character in the data received.

The binary data representing the threshold data signals transmitted over bus 56 are processed by the Image Extraction logic unit 58 which examines every seven bits of the received data. If it finds a zero bit surrounded by one bits, the logic unit will fill in a one bit at that location and then determine if each of the seven bits represents an ink spot which is then represented by a one bit or a blank spot represented by a zero bit. The resulting reduced 14×10 binary bit map (FIG. 2B) of the scanned character is transmitted over bus 62 to an Unfolding Logic unit 64 which examines the 14×10 bit map to locate the top row of the scanned character in its proper location within the bit map. Details of the logic circuits for generating the start and end of the character are fully disclosed in the previously-cited Nally et al., co-pending application, Ser. No. 331,946.

The processed 14×10 bit map outputted by the Unfolding Logic unit 64 is transmitted over bus 66 to a Feature Matching Logic unit 68 which matches known character templates to the bit map appearing on bus 66. The logic unit 68 will generate data and control signals over lines 70 for storage in a Buffer Memory unit 72 representing the results of matching the templates with the received character bit map. The data is then transmitted to a central processing unit 74 for identifying the unknown character from the data received. Details of the construction of the Feature Matching Logic unit 68 are disclosed in the previously-cited Nally et al. co-pending application, Ser. No. 331,935.

Figure 3:
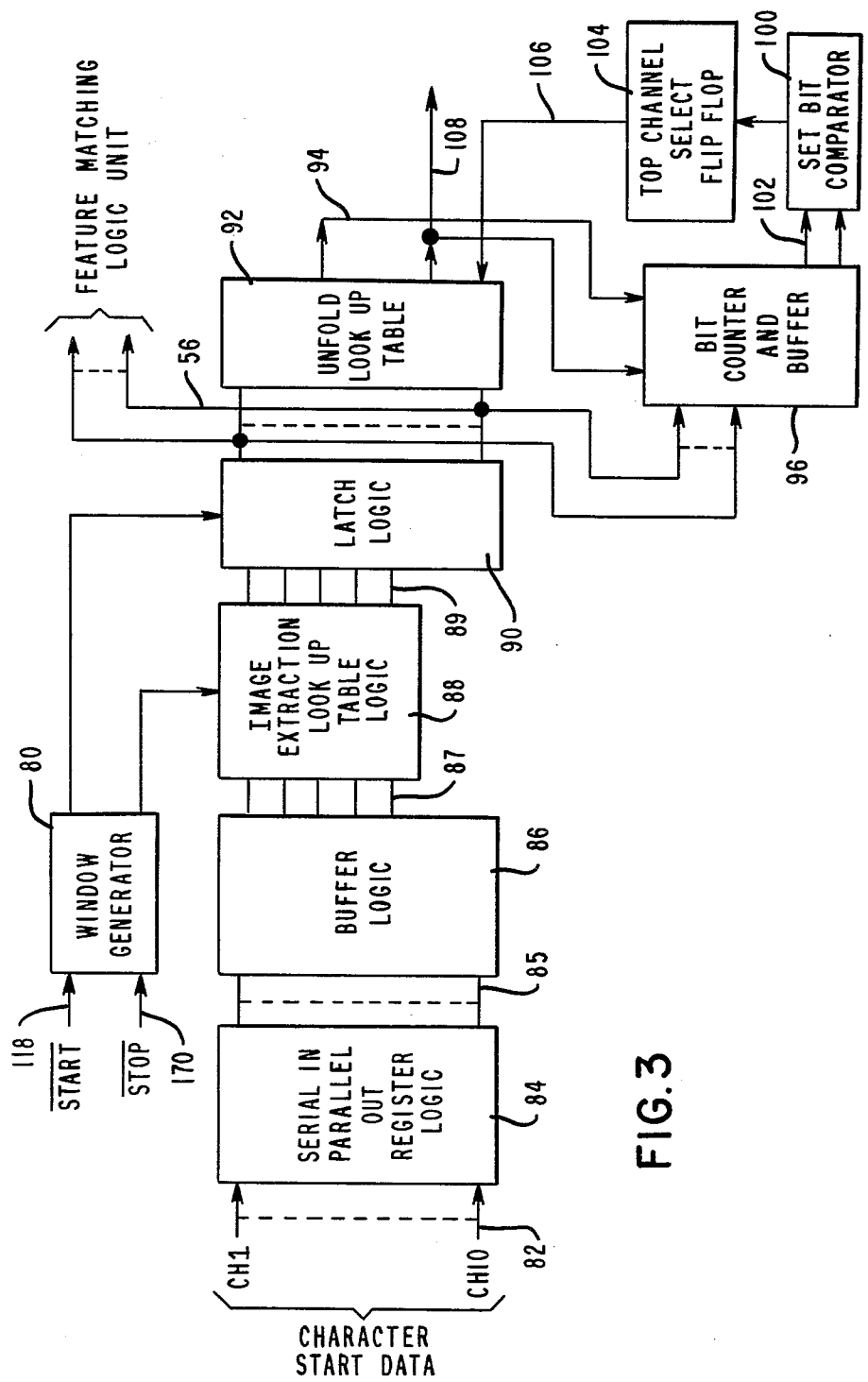
FIG. 3 is a block diagram of the circuits for reducing the data bit maps and unfolding the data bits if the character has been read in a folded condition.

Referring now to FIG. 3, there is shown a block diagram of the circuits used in the Image Extraction logic unit 58 (FIG. 1) and the Unfolding Logic unit 64. As fully disclosed in the previously-cited Nally et al. co-pending application, Ser. No. 331,946, the Character Start logic unit 48 (FIG. 1) will generate a signal START indicating the start of the character and a character end signal CH END indicating the end of the character. These signals control the operation of a Window Generator 80 (FIG. 3) to generate control signals for opening a number of windows on the incoming data bits wherein each window comprises seven data bits. The incoming data bits appear on lines 82 which form the data bus 56 (FIG. 1) and which are inputted into a Serial-In-Parallel-Out Register unit 84 consisting of 10 registers each of which outputs in parallel form a seven bit window of each channel to a Buffer Logic unit 86 which in turn outputs the parallel data bits to an Image Extraction Look-Up Table unit 88. This Table unit 88 fills in any blank spaces if required and then reduces the data to a 14×10 data bit map. The reduced data bit map is latched in a Latch Logic unit 90 which outputs the data bits to an Unfolding Look-Up Table unit 92 which will identify the top two rows of the character. The data outputted by the Latch unit 90 is transmitted into a Counter and Buffer unit 96. The Counter and Buffer unit 96 counts the number of ink spots in each row or channel to identify those rows of data which form the character being scanned. The first two rows having a number of ink spots which follow the clear rows are outputted over lines 102 to a Set Bit Comparator unit 100 which compares the number of ink spots in the two channels to determine the top channel of the character. The Comparator unit 100 will output signals to a Top Channel Select flip-flop unit 104 which outputs a signal over line 106 to the Unfolding Look-Up Table 92 allowing the Look-Up Table unit to output data identifying the top row of the character over line 108 which is transmitted to the Feature Matching Logic unit 68 (FIG. 1).

Figure 5A:
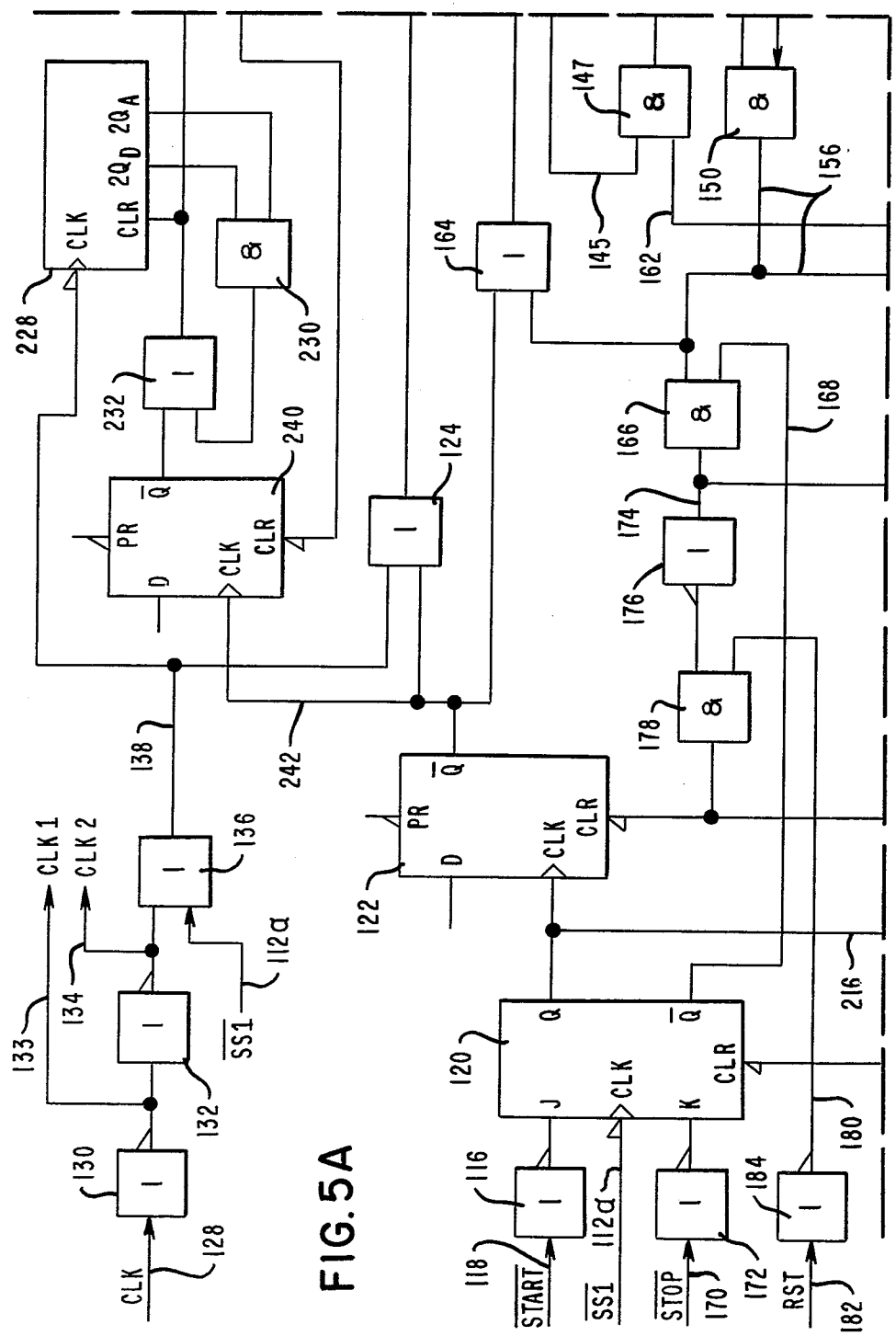
Figure 18:
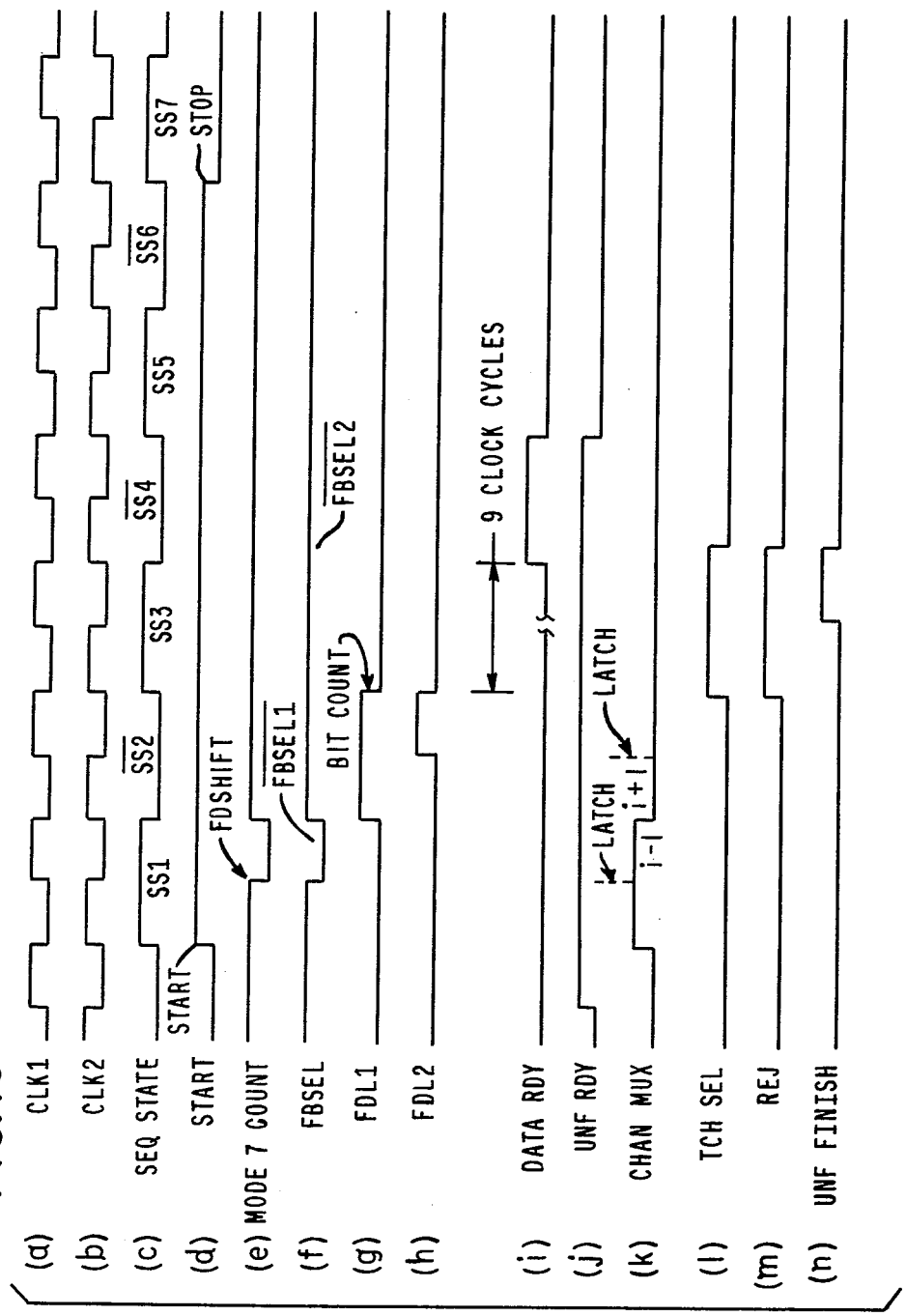
FIG. 18 is a diagram showing various waveforms used in reducing and unfolding the data.

Referring now to FIG. 4, there is shown a 74LS42 sequencer 110 which outputs over lines 112a–112h inclusive the sequence control signals SS1–SS8 inclusive (FIG. 18c) in response to the output count of a counter (not shown) appearing on the input lines 114a–114d inclusive. The sequence control signals are used in sequencing the operation of various logic circuits found in the present invention. Included in these circuits is the window generator unit 80 (FIG. 3) in which the character start signal $\overline{START}$ (FIG. 18d) received from the character start unit 50 (FIG. 1) will be inputted through an inverter 116 (FIG. 5A) over line 118 to the J input of a 74LS107 flip-flop 120. This signal is clocked by the sequence control signal $\overline{SS1}$ appearing on line 112a of the flip-flop 120. The Q output signal of the flip-flop 120 is transmitted to the clock input of a 74LS74 D-type flip-flop 122 whose $\overline{Q}$ output signal is transmitted through an OR gate 124, thereby initiating the operation of a 74LS393 counter 126 (FIG. 5B) which is clocked by the clock signal CLK2 (FIG. 18b) received from a clock generator (not shown) over line 128 (FIG. 5A). The clock signal is transmitted through the inverters 130 and 132 which outputs the clock signals CLK1 (FIG. 18a) over line 133 and CLK2 over line 134 for use in operating the logic circuits. The clock signal CLK2 is transmitted through an OR gate 136 (FIG. 5A) and over line 138 to clock (FIG. 18c) the counter 126.

Upon reaching a count of eight, which represents the width of the first window during which eight data bits of the received data appearing on lines 82 (FIG. 3) are examined for image extraction, the output count signals of the counter 126 (FIG. 5B) are transmitted through the logic circuits comprising AND gates 140, 142 and 144 together with an OR gate 146 to output a high signal, which appears on the output line 148. This signal is transmitted through an AND gate 150 (FIG. 5A) which has been enabled by the sequence control signal SS7 (FIG. 18C) transmitted over line 152 from the inverter 154 (FIG. 5B). The output signal of the AND gate 150 is transmitted over line 156 to the clock input of a 74LS74 flip-flop 158 (FIG. 5C). The clocking of the flip-flop 158 will output a high signal over line 160 and a low signal over line 162. The high signal on line 160 enables an AND gate 144 (FIG. 5B) to output a high signal received from the AND gates 140 and 142 and the counter 126 when the output count reaches seven. The low signal on line 162 disables the AND gate 147 (FIG. 5A). The high signal outputted by the AND gate 144 upon the counter 126 reaching a count of seven is transmitted through the OR gate 146, the AND gate 150 and an OR gate 164 to reset the counter 126.

Each succeeding window generated by the counter 126 with the flip-flop 158 in a set condition will have a width of seven data bits. The high signal appearing on line 156 is transmitted through the OR gate 164 resetting the counter 126. The signal appearing on line 156 is also inputted into an AND gate 166 (FIG. 5A) which is enabled by a high signal appearing on line 168 which is generated by the end of character signal $\overline{STOP}$ appearing on line 170 and transmitted through an inverter 172 to the K input of the flip-flop 120. The enabling of the AND gate 166 outputs a high signal over line 174 through an inverter 176 which signal is gated by an AND gate 178 to the clear input of the flip-flop 122, thereby resetting the flip-flop. The AND gate 178 is enabled by a high signal appearing on line 180 which is the inverted system reset signal RST appearing on line 182 and transmitted through the inverter 184.

Figure 5D:
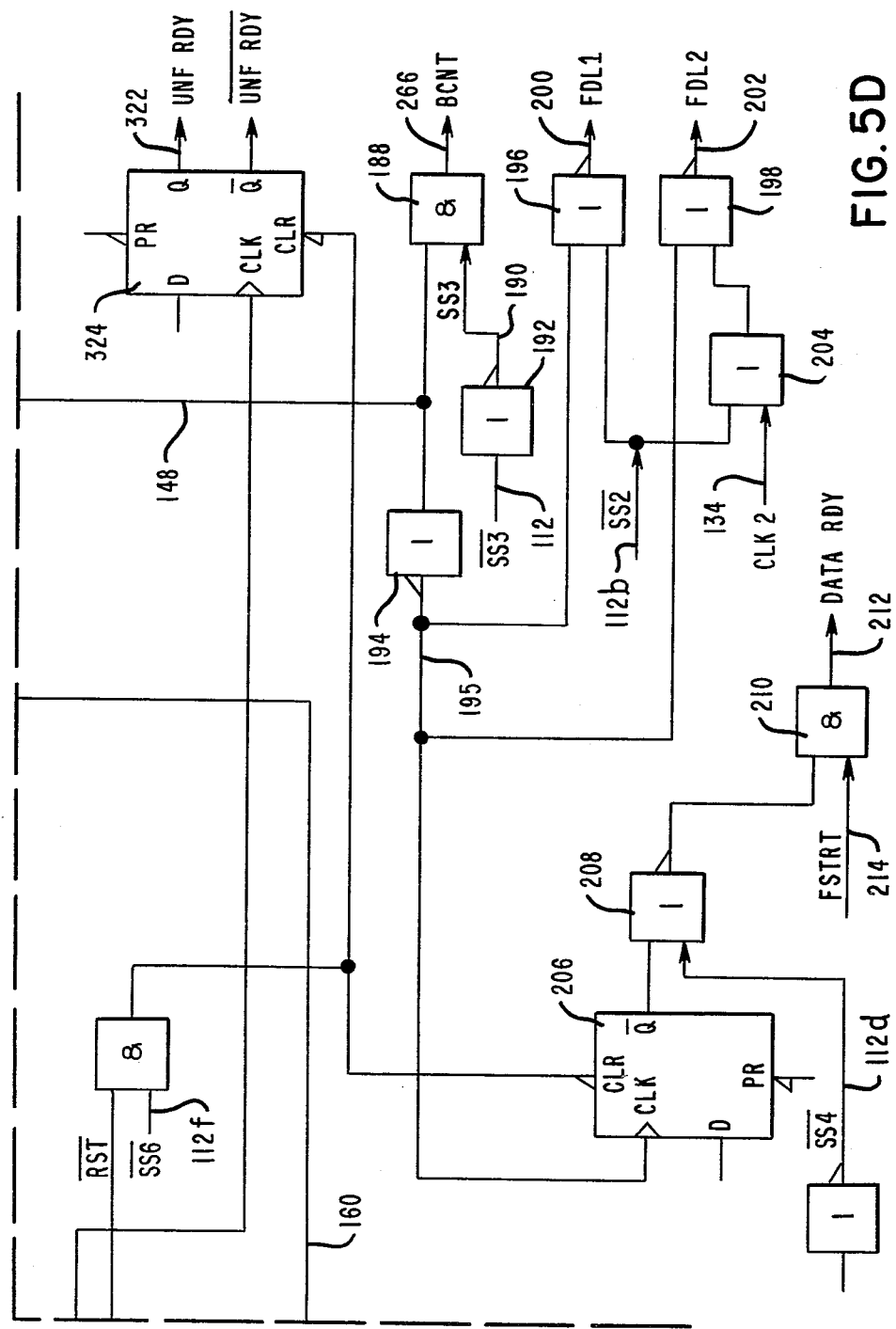
Figure 7:
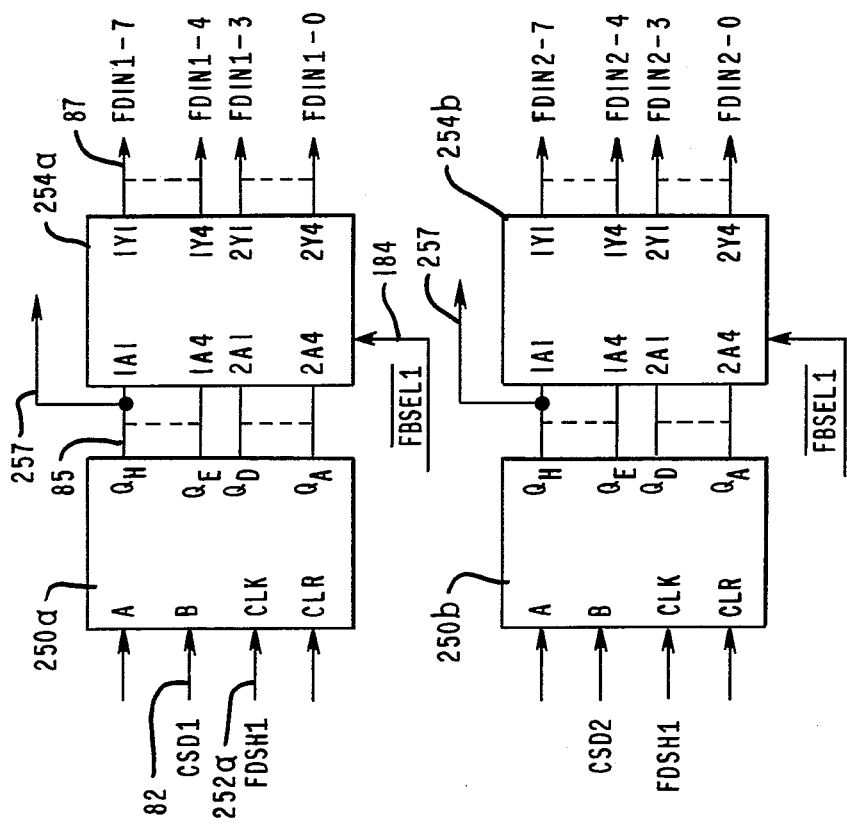
FIGS. 7-10 inclusive disclose the logic circuits comprising the serial-in-parallel-out registers and the buffer units of FIG. 3.
Figure 8:
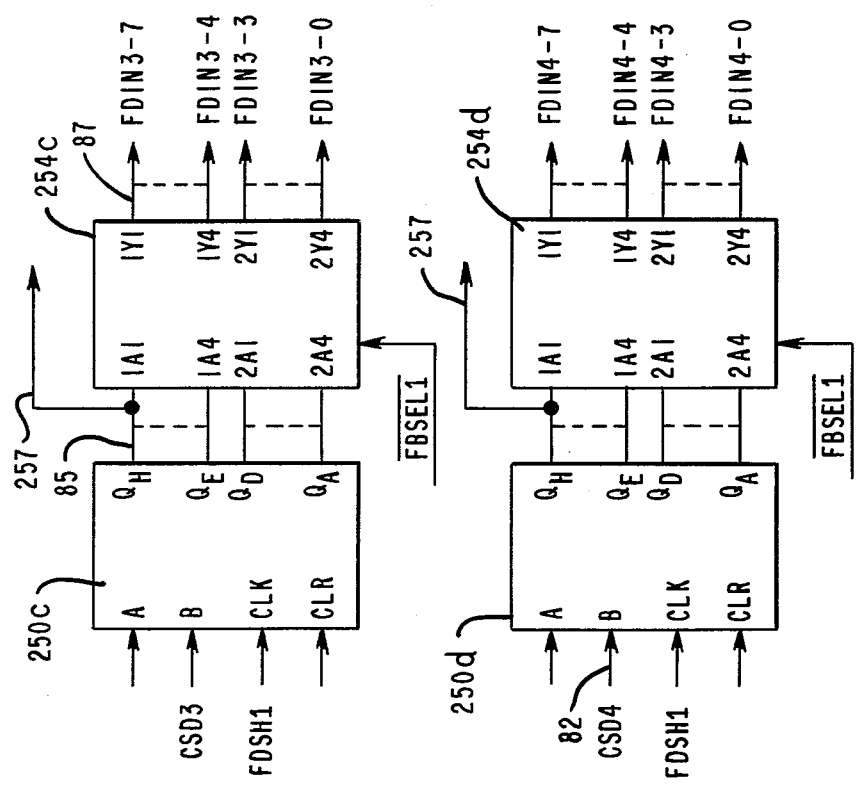
Figure 9:
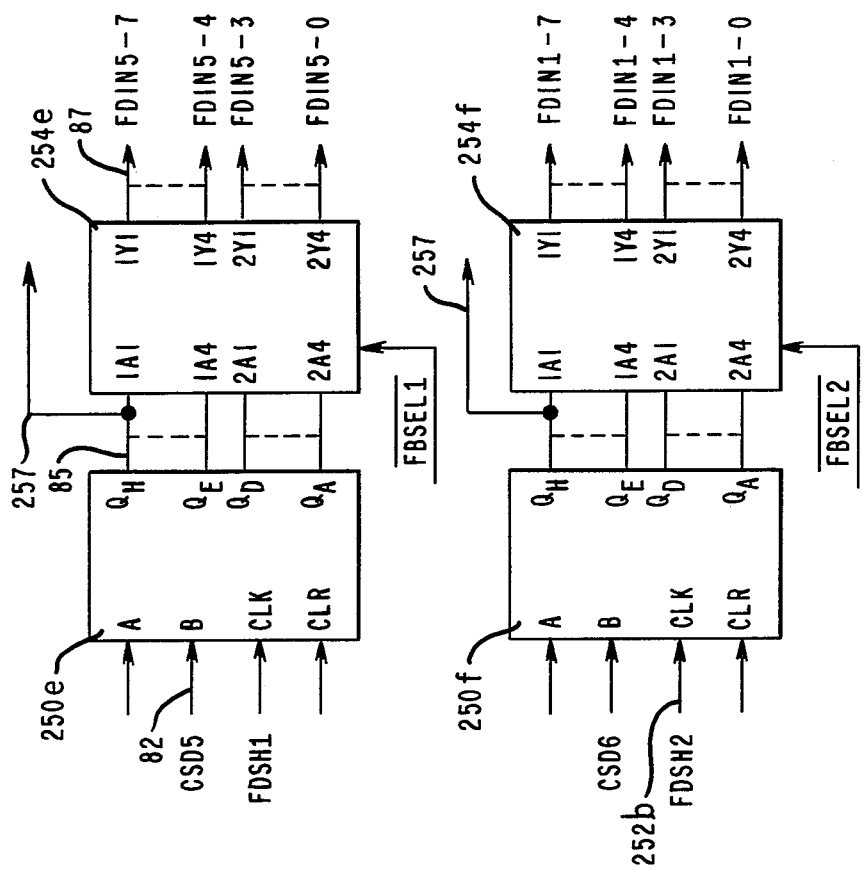
Figure 10:
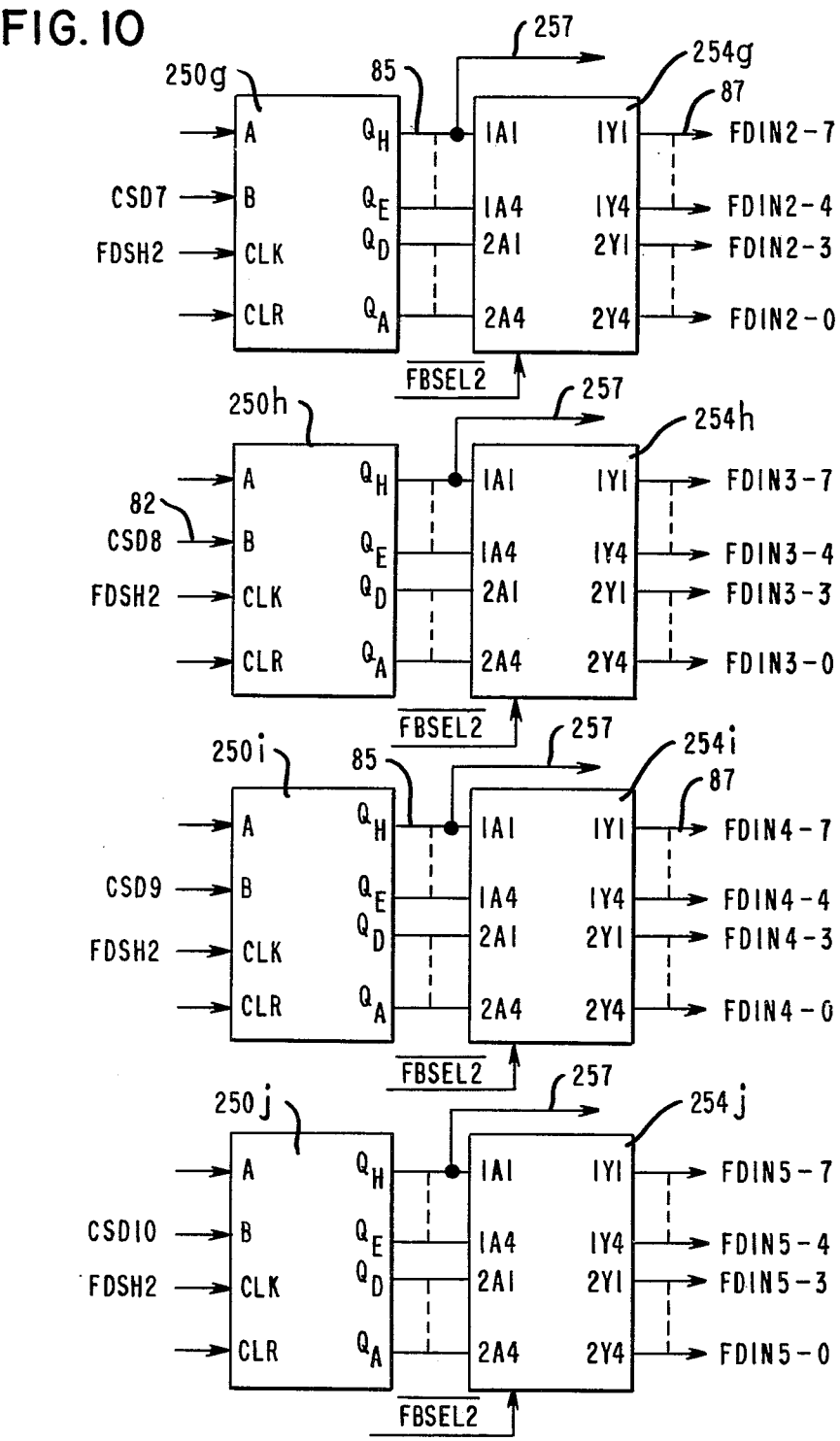
Figure 19:
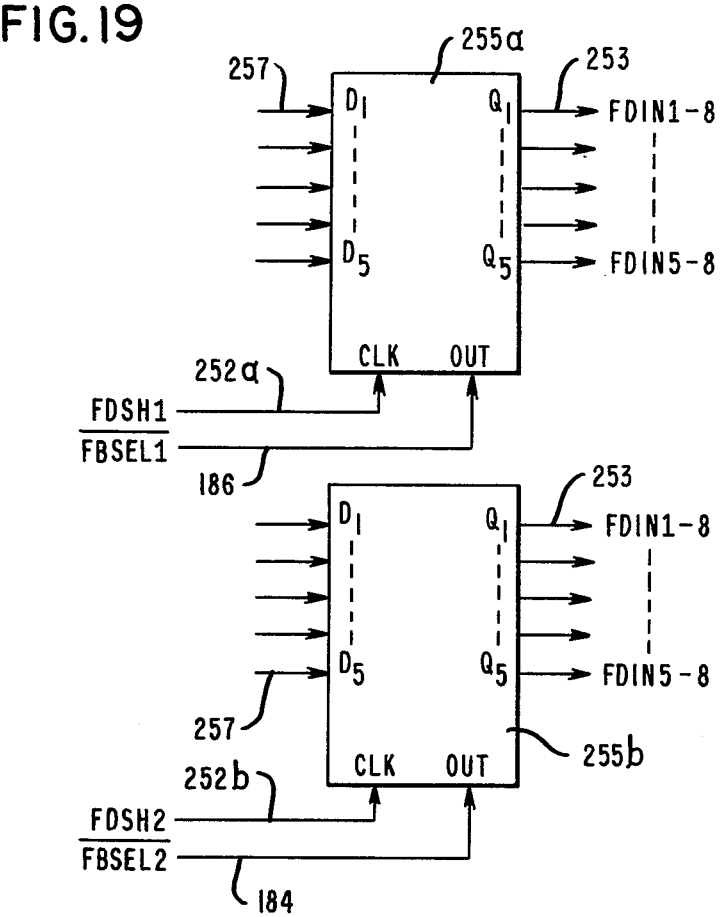
FIG. 19 is a diagram of the logic circuits for generating the extra data bit used in the filling in operation.

The generation of the high signal over line 148 results in the clocking of a 74LS74 flip-flop 182 (FIG. 5B) which outputs the feature data bank select signal $\overline{FBSEL2}$ (FIG. 18f) over line 184 and FBSEL1 over line 186. The high signal appearing on line 148 is also inputted into an AND gate 188 (FIG. 5D) which is enabled by the sequence control signal SS3 appearing on line 190 and which is outputted from the inverter 192 (FIG. 5D). The high signal appearing on line 148 is inverted by the inverter 194 (FIG. 5D) and inputted over line 195 into the NOR gates 196 and 198 to output the feature data latch signal FDL1 (FIG. 19g) over line 200 and FLD2 (FIG. 19h) over line 202. These signals are controlled by the sequence control signal $\overline{SS2}$ (FIG. 18c) appearing on line 112b and the system clock signal CLK2 (FIG. 18b) appearing on line 134 and transmitted through the OR gate 204.

The inverted signal appearing on line 195 clocks a 74LS74 flip-flop 206 (FIG. 5D) whose $\overline{Q}$ output signal is transmitted through a NOR gate 208 and an AND gate 210 to output the data ready signal DATA RDY (FIG. 18i) over line 212 to the Feature Matching Logic unit 68 (FIG. 1) for notifying such unit of data available for a feature matching operation. The NOR gate 208 is enabled by the sequence control signal $\overline{SS4}$ appearing on line 112d while the AND gate 210 is enabled by the feature start signal FSTRT over line 214 which goes high in a manner to be described more fully hereinafter.

Figure 11:
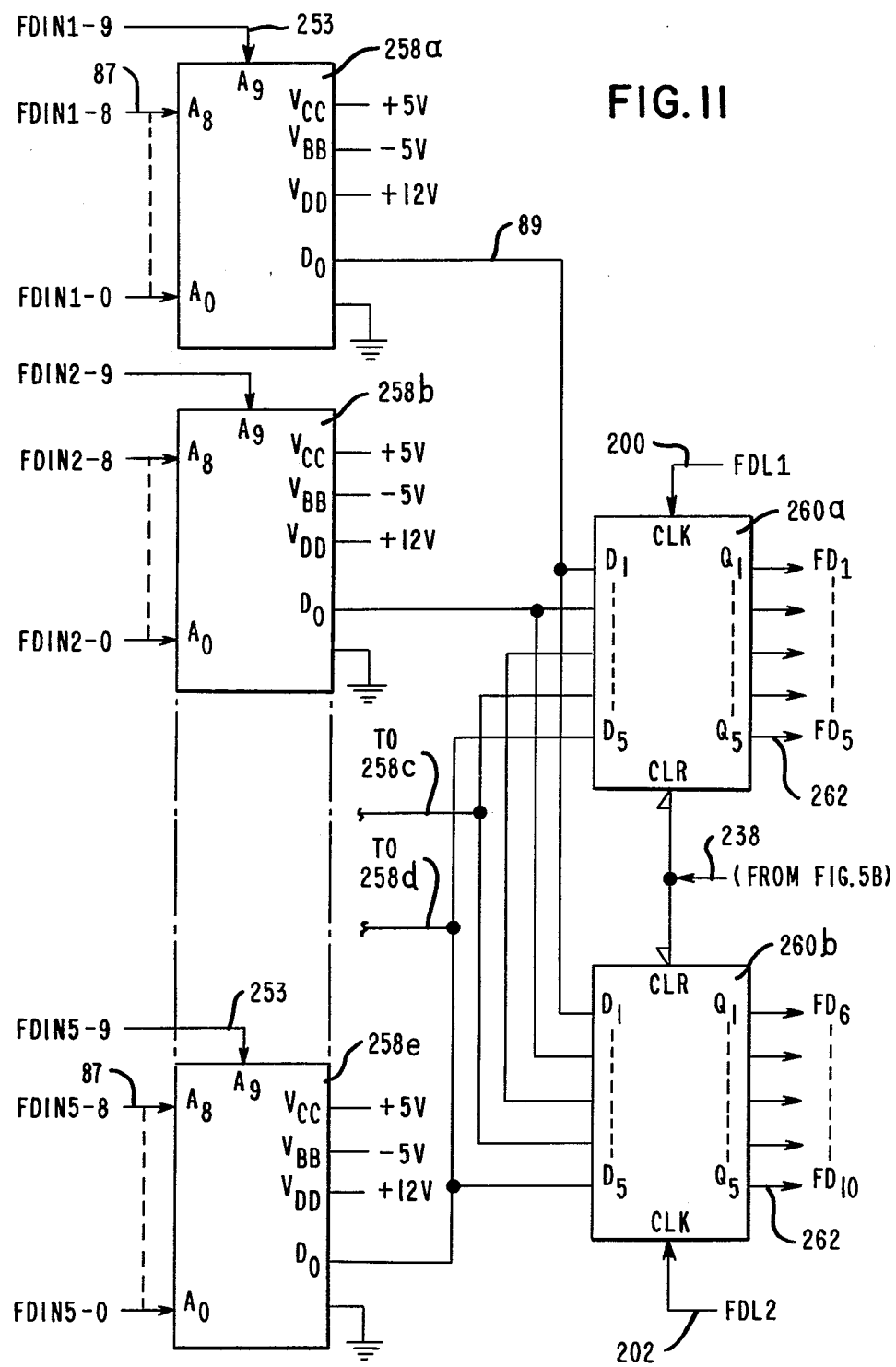
FIG. 11 is a diagram of the logic circuits found in the image extraction and lookup table unit of FIG. 3.

The Q output signal of the flip-flop 120 (FIG. 5A) is transmitted over line 216 to clock a 74LS74 flip-flop 218 (FIG. 5C) which outputs the counter clear signals CCLR1 over line 220, CCLR2 over line 222, $\overline{LCLR1}$ over line 224 and $\overline{LCLR2}$ over line 226. The clock signal CLK2 (FIG. 18b) appearing on the output line 138 of the OR gate 136 (FIG. 5A) will clock a 74LS393 counter 228 whose output count of nine will enable an AND gate 230 to output a high signal through an OR gate 232, inverter 234 (FIG. 5B) and an OR gate 236 to output over line 238 a clear signal for clearing the contents of a pair of latch members 260a and 260b (FIG. 11). The counter 228 (FIG. 5A) is cleared by the $\overline{Q}$ output signal of a flip-flop 240 (FIG. 5A) which is clocked by the output signal of flip-flop 122 appearing on line 242 when reset by the appearance of the character end signal $\overline{STOP}$ appearing on line 170. This signal will also clear the counter 126 when transmitted through the OR gate 164 (FIG. 5A).

Referring now to FIGS. 7–10 inclusive, there is shown the Serial-In-Parallel-Out Register unit 84 (FIG. 3) and the Buffer unit 86. The Register unit 84 comprises a plurality of 74LS164 serial-in-parallel-out registers 250a–250j inclusive which receive over lines 82 in serial form from the character start unit 50 (FIG. 1) the character data bits CSD1–CSD10 inclusive for each channel. The registers 250a–250j inclusive are enabled by the control signal FDSH1 (FIGS. 7, 8 and 9) and FDSH2 (FIGS. 9 and 10) appearing on lines 252a and 252b respectively (FIG. 5B), which signals are the clock output signals of the OR gate 164 (FIG. 5A). The eight bits of each channel are parallel outputted over lines 85 to a plurality of 74LS244 buffer units 254a–254j inclusive, comprising the Buffer Logic unit 86 (FIG. 3), which output the eight feature data signals FDIN over lines 87 to a plurality of 2708L EPROMs look-up tables 258a–258e inclusive (FIG. 11), which are part of the Image Extraction Look-Up Table Logic unit 88 (FIG. 3).

As shown in FIG. 11, each of the EPROMs 258a–258e inclusive receives, in addition to the eight bits over lines 87, a ninth bit over line 253 which is outputted by a pair of 74LS374 octal flip-flops 255a and 255b (FIG. 19) which receive over lines 257 the first output bit from the serial-in-parallel-out registers 250a–250j (FIGS. 7–10 inclusive). The flip-flops 255a and 255b are enabled by the control signals FDSH1 and FDSH2 appearing on lines 252a and 252b (FIG. 5B) and the control signals FBSEL1 and FBSEL2 appearing on lines 186 and 184 to output a bit signal over lines 253 to the EPROM members 258a–258e inclusive. Each of the EPROM members 258a–258e inclusive (FIG. 11) examines every three bits in each of the channels to determine if there exists a condition where a zero bit is surrounded by two adjacent one bits. If such a condition exists, the EPROM member will fill in a one at that position and then count the number of one bits that occur in the channel. If there are at least six one bits out of seven bits in a channel, the EPROM member will output a high signal over line 89 to a pair of latch members 260a and 260b which are part of the Latch Logic unit 90 (FIG. 3) representing the seven bits in the channel, thus reducing the bit map from 98 bits to 14 bits wide. The bit signal appearing on lines 253 is required to allow the EPROM members 258a–258e inclusive to examine the first and last bit in each window with the bit located in the adjacent windows. The latch members 260a and 260b are sequentially enabled by the signals FDL1 (FIG. 18g) appearing on line 200 and FDL2 (FIG. 18h) appearing on line 202 (FIG. 5D) to store the reduced bit map.

Figure 14:
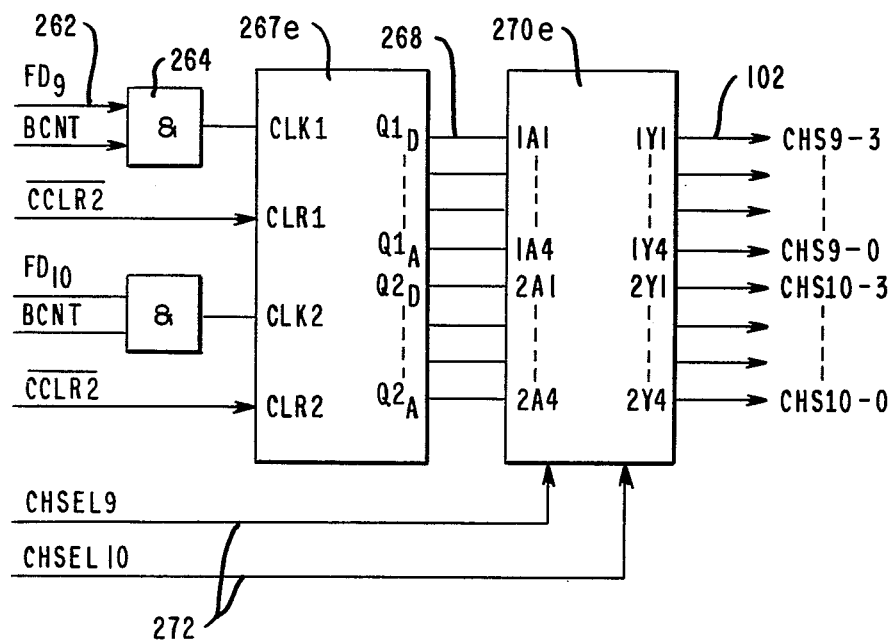
Figure 17:
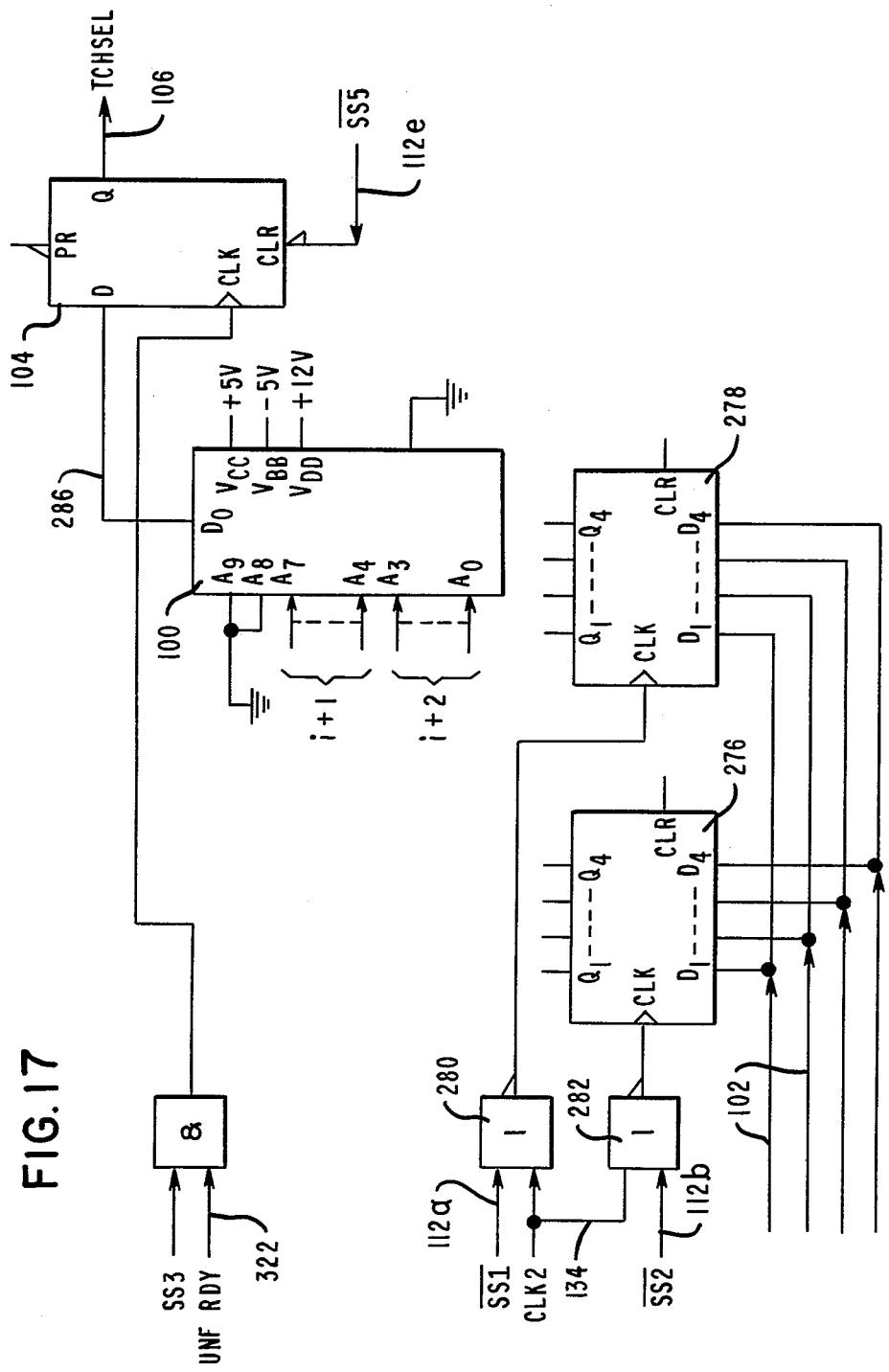
FIG. 17 is a diagram of the logic circuits associated with the set bit comparator unit of FIG. 3.

The feature data bits FD stored in the latches 260a and 260b representing the reduced map of the character scanned are outputted over lines 262 to one input of a plurality of AND gates 264 (FIGS. 12–14 inclusive) which are enabled by the output signal BCNT of the counter 126 (FIG. 5B) and which appear on line 266. The output signal of each of the AND gates 264 is inputted into one of a plurality of 74LS393 dual counters 267a–267e inclusive (FIGS. 12–14 inclusive), included in the Bit Counter and Buffer unit 96 (FIG. 3), which count the number of bits in each channel. The output count CHS of each of the counters 267a–267e inclusive representing the sum of the ink spots in each channel are outputted over lines 268 to a plurality of 74LS244 buffer members 270a–270e inclusive which are enabled by the channel select control signals CHSEL-1–CHSEL10 inclusive appearing on lines 272 to output the sum of the binary one data bits in each channel over lines 102. As will be described more fully hereinafter, the top two channels or rows of the character are determined and the buffer members 270a–270e containing these channels are sequentially enabled to output the sum of each of the two channels over the lines 102 into a pair of latch members 276 and 278 (FIG. 17). The latch members 276 and 278 are clocked by the sequence control signals $\overline{SS1}$ appearing on line 112a, the clock signal CLK2 (FIG. 18b) appearing on line 134 and the sequence control signal $\overline{SS2}$ appearing on line 112b, which signals are inputted through the NOR gates 280 and 282 to enable (FIG. 18k) the latch members 276 and 278 to output the first and second top channels of the character into a 2708 EPROM table look-up member comprising the Set Bit Comparator 100 (FIGS. 17 and 3), which compares the number of bits in each of the channels. If the second channel has more than twice the number of ink spots than that of the first channel, a signal is transmitted over line 286 to the D-input of the Top Channel Select flip-flop 104 (FIGS. 17 and 3), which outputs over the Q output line 106 the top channel select signal TCHSEL (FIG. 19i).

Figure 15:
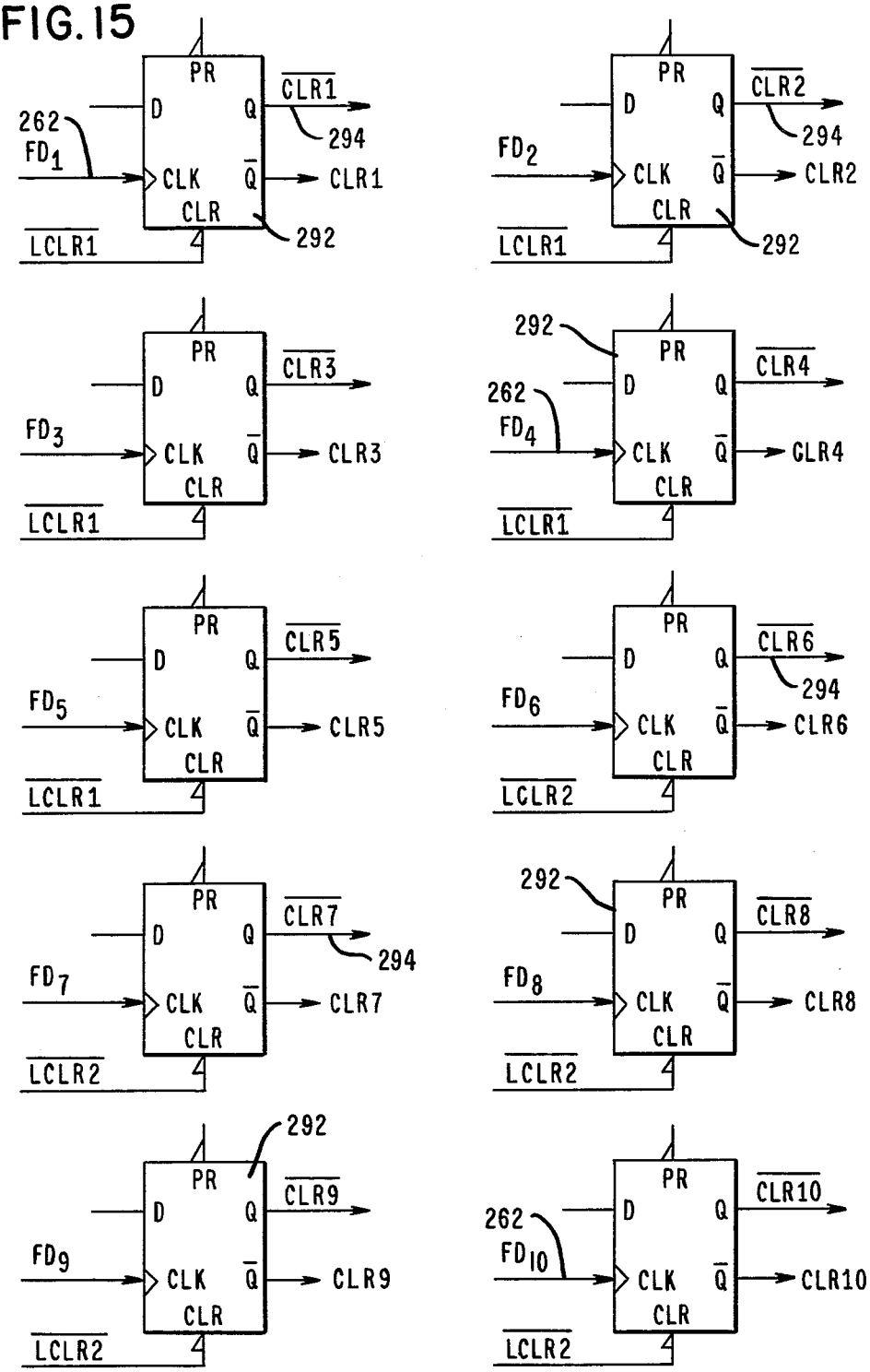
FIG. 15 is a diagram of the logic circuits used in selecting the top channel of the character scanned.

The feature data bits FD appearing on the output lines 262 of the latch members 260a and 260b (FIG. 11) are also inputted into the clock input of a plurality of 74LS74 flip-flops 292 (FIG. 15). If the signal appearing on the lines 262 is high indicating that the channel is a portion of the character being read and is represented by a one, the associated flip-flops 292 are clocked which output the high signal $\overline{CLR1-CLR10}$ over lines 294 to a 2716 EPROM look-up table 296 (FIG. 16) which examines the inputted data to determine the two top channels or rows of the character. This is accomplished by locating the largest number of clear channels represented by a zero bit on the input lines 294 and then identifying the following two channels represented by a one bit as the top two channels of the character. As the data representing the reduced bit map is transmitted over lines 262 to each of the flip-flops 292 (FIG. 15), those flip-flops which receive a one bit over the input lines 262 will be clocked to output the high signals $\overline{CLR1-CLR10}$ to the table look-up member 296. After processing the received data, the member 296 (FIG. 16) will output over lines 298 the data bits identifying the top row of the character and over lines 300 the second top row of the character. These signals are transmitted to a buffer unit 302 which sequentially outputs the data to a 74LS42 decoder 304. The decoder 304 will output the appropriate channel select signals $\overline{CHSEL1-CHSEL10}$ over the lines 272 to the buffer units 270a–270e inclusive (FIGS. 12–14 inclusive) containing the identified top two channels sequentially enabling the signals appearing on the output lines 102 to be transmitted to the latch members 276 and 278 (FIG. 17) in the manner described previously.

The data output signals from the buffer unit 302 are also outputted over lines 306 to a 74LS174 latch member 308 which, when enabled, outputs over lines 310 binary signals identifying the top row of the character and which signals are transmitted to the Feature Matching Logic unit 68 (FIG. 1).

Figure 16:
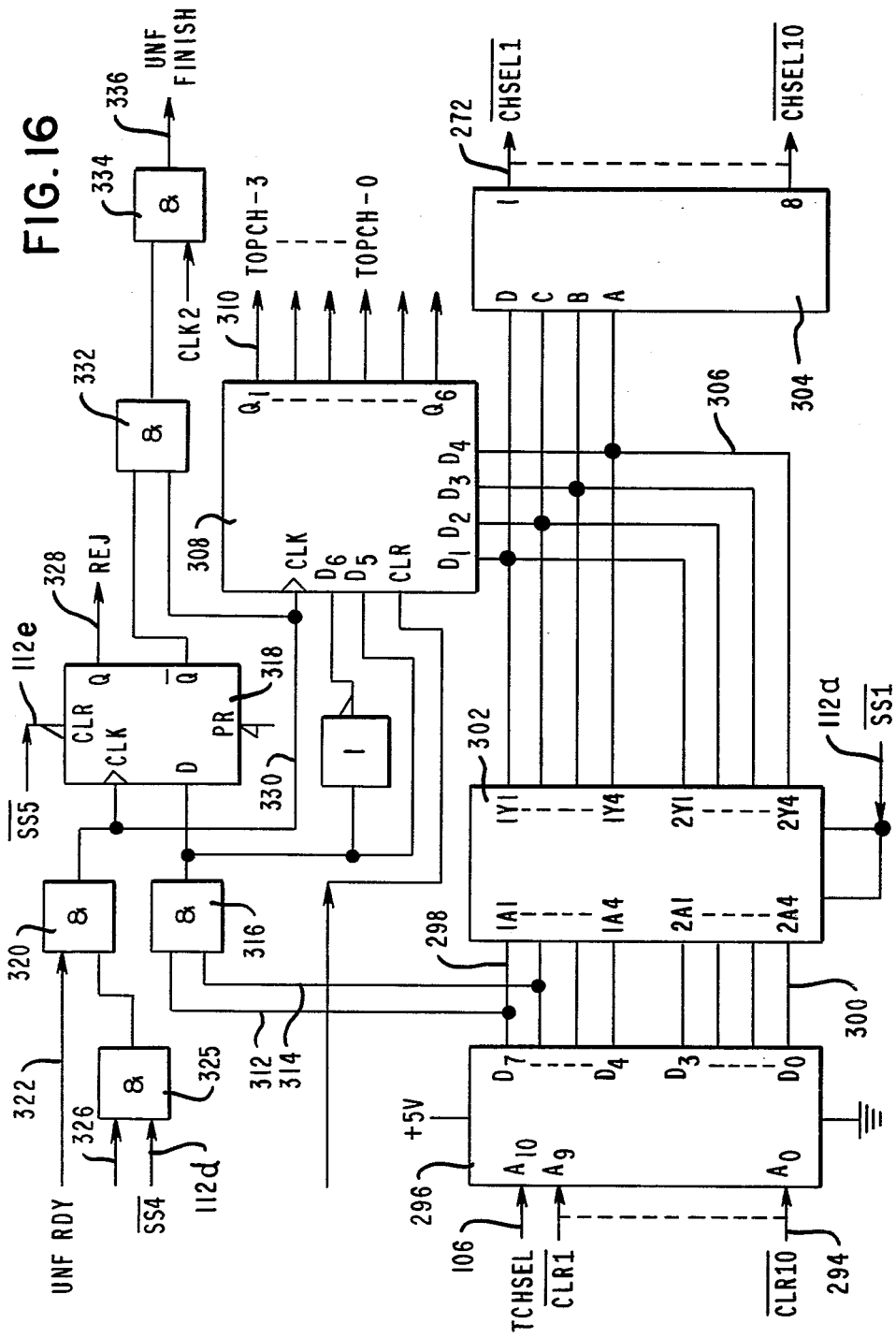
FIG. 16 is a diagram of the logic circuits associated with the unfolding lookup table unit of FIG. 3.

If the table look-up member 296 is unable to determine the top row of the character due to the lack of any clear channels or the presence of too many clear channels, a pair of high signals will be outputted over lines 312 and 314 to an AND gate 316 which outputs a high signal into the D input of a 74LS74 flip-flop 318 (FIG. 16). The flip-flop 318 is clocked by a high signal outputted from an AND gate 320 which receives over line 322 the unfolded ready signal UNF RDY (FIG. 18j) generated by the clocking of the flip-flop 324 (FIG. 5D) and a high signal outputted by an AND gate 325 which receives the sequence control signal $\overline{SS4}$ appearing on line 112d and a high signal appearing on line 326. The clocking of the flip-flop 318 will output the reject signal REJ (FIG. 18m) over line 328 to the Feature Matching Logic unit 68 (FIG. 1). The output signal of the AND gate 320 is also transmitted over line 330 to clock the latch member 308 together with disabling an AND gate 332 whose other input is connected to the $\overline{Q}$ output of the flip-flop 318. The output of the AND gate 332 is inputted into a second AND gate 334 whose unfolding finish output signal UNF FINISH (FIG. 18n) appearing on line 336 will go high when the output signal of the AND gate 332 goes high, indicating the end of the unfolding operation.

In the operation of the pre-processing system, the 98×10 data bit map outputted from the dynamic Thresholding Logic unit 46 (FIG. 1) is inputted over bus 56 into the serial-in-parallel-out registers 252a-252j inclusive (FIGS. 7-10 inclusive) which output the data in parallel form into the buffers 254a-254j inclusive and from which the data bits in the ten channels are multiplexed into the look-up tables 258a-258e inclusive (FIG. 11) five channels at a time. Inputted into the look-up tables 258a-258e inclusive is a ninth binary bit outputted by the flip-flops 255a and 255b (FIG. 20) which receive the first bit outputted over lines 257 from the registers 250a-250j inclusive (FIGS. 7-10 inclusive). The look-up table members 258a-258e inclusive examine each seven bits of the data stream and fill in a binary one in the stream of data where they find a zero bit surrounded by binary one bits. The look-up table members 258a-258e inclusive will also sum the data bits in each window and if they find that six or more of the data bits are binary ones, they will output a binary one to the latch members 260a and 260b (FIG. 11). Conversely, if they find that the sum of binary one bits in a channel is less than six, such table members will output a binary zero for that channel. This operation reduces the bit map from a 98×10 bit configuration to a 14×10 bit configuration.

The reduced bit map now stored in the latch members 260a and 260b (FIG. 11) is outputted to the binary counters 267a-267e inclusive (FIGS. 12-14 inclusive), which counters count the number of one bits in each channel to establish if the data bits in the channel comprise a row of the character being scanned. The data bits of the reduced map are also outputted to the flip-flops 292 (FIG. 15) which will be set when a channel is found to be represented by a binary one bit indicating that the channel represents a row of the character being scanned.

The flip-flops 292 (FIG. 15) will output a binary signal representing that a channel comprises either a clear row of data bits or a row of the character to the table look-up member 296 (FIG. 16) which looks for the location of the first two channels represented by a binary one which follows the largest number of clear channels. The first channel represented by a binary one following the clear channels is assumed to be the top row of the character and, together with the next channel, is outputted to the buffer 302 and then to the decoder 304 which will output the channel select signals corresponding to the top and second row of the character. These signals will enable the corresponding buffers 270a-270e inclusive (FIGS. 12-14 inclusive) which have received from the counters 267a-267e inclusive the sum of the binary one bits in each of the top two rows of the character.

The sum of the binary one bits in the top two rows stored in the buffers 270a-270e inclusive are inputted into the latches 276 and 278 (FIG. 17) which output the values to the look-up table member 100. The table member 100 compares the sum of the binary one bits in each row. If the second row has more than twice the number of binary one bits as the first row, the second row is selected as the top row of the character. If not, the first row is selected. The look-up table member 100 will enable the flip-flop 104 (FIG. 17) to output the top row select signal TCH SEL (FIG. 191) which enables the latch member 308 (FIG. 16) to output over lines 310 the channel number in which is located the top row of the character to the Feature Matching Logic unit 68 (FIG. 1) together with the unfolding signal UNF FINISH (FIG. 19n) over line 336.

The integrated circuit networks having a numerical designation disclosed herein are commercially available from the Texas Instruments Corporation of Dallas, Tex.

While the preferred embodiment of the invention has been described in detail for processing data relating to the recognition of characters in a standard E-13B character font, the data preprocessing system could be easily adapted by a person of ordinary skill in the art to process data generated from reading characters and symbols from any standard character font without departing from the spirit of the invention. Furthermore, it is understood that changes and details of the preferred embodiment may be made without departing from the spirit and scope of the claims as defined in the appended claims.

We claim:

1. A method for processing data signals representing an unknown character comprising the steps of:
   generating a plurality of parallel rows of first data signals representing feature characteristics of a character and rows of second data signals representing background characteristics of a character;
   detecting the largest number of consecutive rows of only said second data signals;
   detecting the first row of first data signals which is adjacent to said rows of said second data signals;
   and generating a control signal identifying the adjacent first row as the top row of the character.

2. The method of claim 1 which further includes the step of comparing the first adjacent row of first data signals with the next adjacent row of first data signals and identifying the top row of the character as the row having the largest number of first data signals.

3. The method of claim 2 which further includes the steps of examining the rows of first and second data signals; detecting the presence of a second data signal in a row surrounded by said first data signals and replacing the detected second data signal with a first data signal in the row.

4. A method for processing data signals representing an unknown character comprising the steps of:
   generating a plurality of rows of first binary data bits representing feature characteristics of a character and second binary data bits representing background characteristics of a character;
   detecting the presence of a second data bit surrounded by said first data bits;
   replacing the detected second data bit with a first data bit in the row;
   reducing the number of data bits in each row;
   detecting the location of the largest number of consecutive rows having only said second data bits;
   detecting the first two rows of first data bits which follows said consecutive rows of second data bits;
   comparing the number of first data bits in the said first two rows following said consecutive rows of second data bits;
   and generating a control signal identifying the top row of the character as the detected row having the largest number of first data signals.

5. The method of claim 4 in which the step of detecting the first two rows of first data bits includes the step of counting the number of first and second data bits in each row to identify the row which contains the largest number of first data bits or to identify the row which contains the largest number of data bits.

6. A system for processing rows of first and second feature characteristic signals in which the first signal represents a feature characteristic of an unknown character and the second signal represents the background of the unknown character comprising:

means for examing the second signals in each row to produce separate rows of first signals and rows of second signals;

means for detecting the first two rows of first signals which follows the largest number of consecutive rows of only said second signals;

means for comparing the number of said first signals in each of said first two rows of first signals;

and means for generating a control signal identifying the top row of the character as the row of said first two rows containing the largest number of first signals.

7. The processing system of claim 6 in which said examining means includes a first decoding means which receives each row of first and second signals, said decoding means replacing a second signal surrounded by first signals with a first signal, said decoding means further counting a predetermined number of signals in each row and replacing said number of signals with a first or second binary signal representing the majority of corresponding signals counted in said predetermined number of signals and first means for storing the reduced number of signals in each row.

8. The processing system of claim 7 in which said detecting means includes:

means for counting the number of first signals in each row stored in said storing means;

second means for storing the output count of said counting means;

and second decoding means connected to said second storing means for receiving the output count of said second storing means, said second decoding means outputting a third binary signal identifying the first row of first signals following the highest number of adjacent rows of second signals.

9. The processing system of claim 8 in which said second decoding means further outputs fourth binary signals identifying the second row of first signals following the highest number of adjacent rows of second signals.

10. The processing system of claim 9 in which said first and second decoding means comprises read only memory devices.

11. The processing system of claim 9 in which said comparing means comprises third decoding means connected to said generating means for outputting a fifth binary signal to said generating means identifying the row of first signals having a predetermined number of first signals, said generating means outputting said fifth binary signal in response to receiving said fourth binary signal.

12. The processing system of claim 11 in which the predetermined number is twice the number of first signals in the row of the first two rows containing first signals following the highest number of adjacent rows of only second signals with the least number of first signals.

* * * * *